United States Patent
Tsai

[11] Patent Number: 5,953,169
[45] Date of Patent: Sep. 14, 1999

[54] ROTARY DRUM TYPE OPTICAL FILTER APPARATUS

[75] Inventor: Jenn-Tsair Tsai, Science-Based Industrial Park, Taiwan

[73] Assignee: Mustek System Inc., Hsinchu, Taiwan

[21] Appl. No.: 08/787,754

[22] Filed: Jan. 28, 1997

[51] Int. Cl.⁶ .................................................. G02B 5/22
[52] U.S. Cl. .................. 359/889; 359/890; 359/892; 359/773; 356/418
[58] Field of Search ..................................... 359/889, 890, 359/891, 892, 722, 723; 250/226; 356/418

[56] References Cited

U.S. PATENT DOCUMENTS 5,220,464  6/1993  Lin ........................................... 359/889
5,363,247  11/1994  Liu et al. .................................. 359/889

*Primary Examiner*—Cassandra Spyrou
*Assistant Examiner*—Darren E. Schuberg
*Attorney, Agent, or Firm*—Knobbe, Martens, Olson & Bear LLP

[57] ABSTRACT

The present invention relates to a rotary drum type optical filter apparatus, which comprises a filter unit for receiving an optical signal to spectralize the optical signal; a lens unit provided at the center of the filter unit for varying an optical path of the optical signal; and a driving device engaged with the filter unit for providing a displacement of the filter unit relative to the lens unit to obtain different spectrum colors of the optical signal.

18 Claims, 7 Drawing Sheets

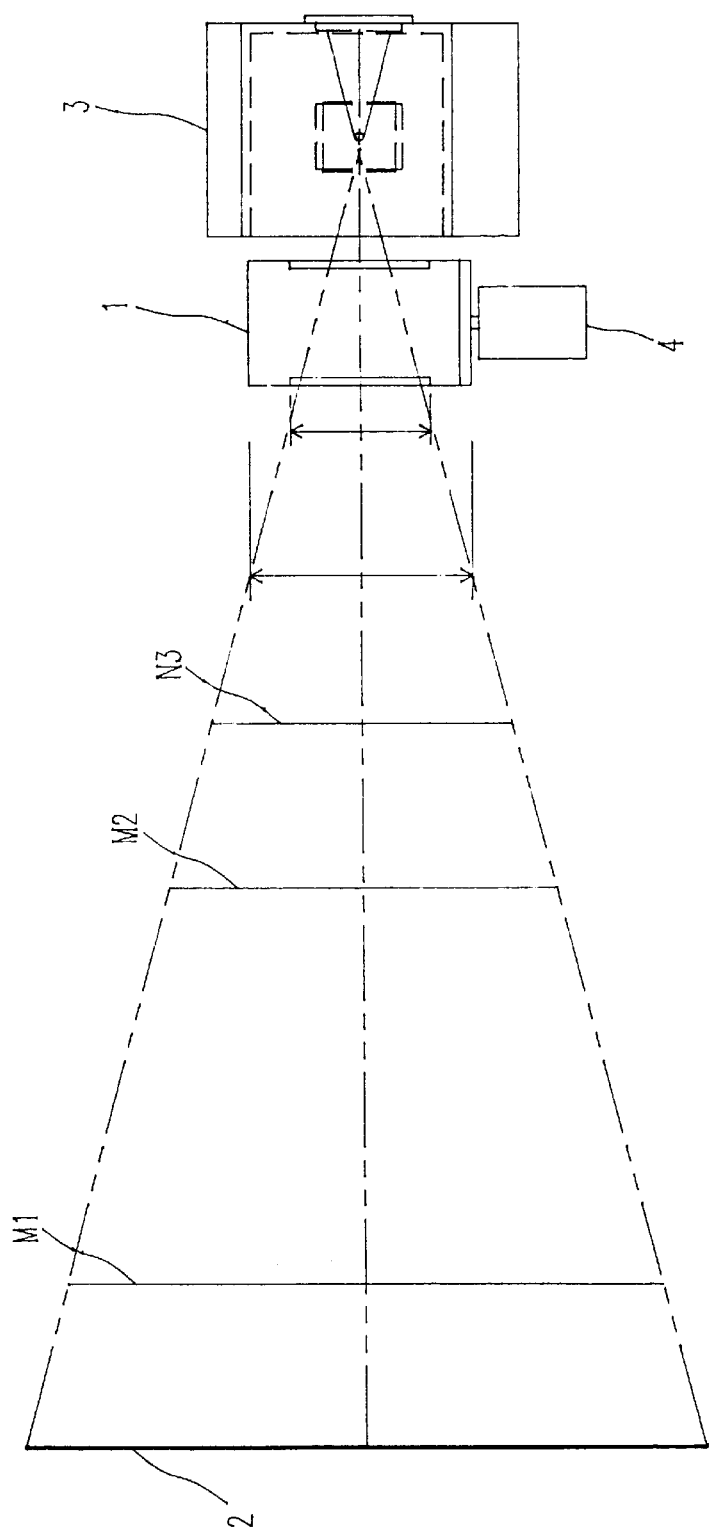
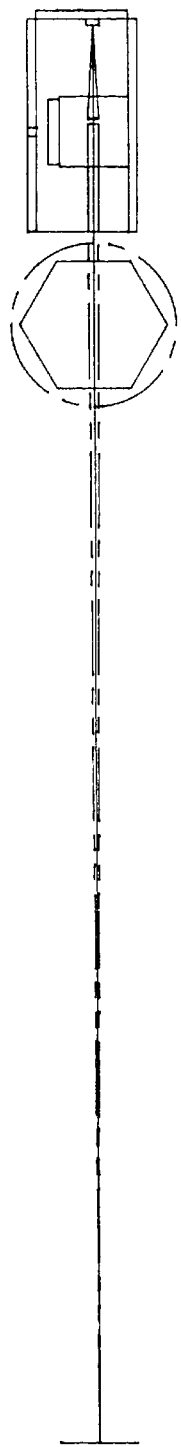
Fig. 2(a) PRIOR ART
Fig. 2(b) PRIOR ART

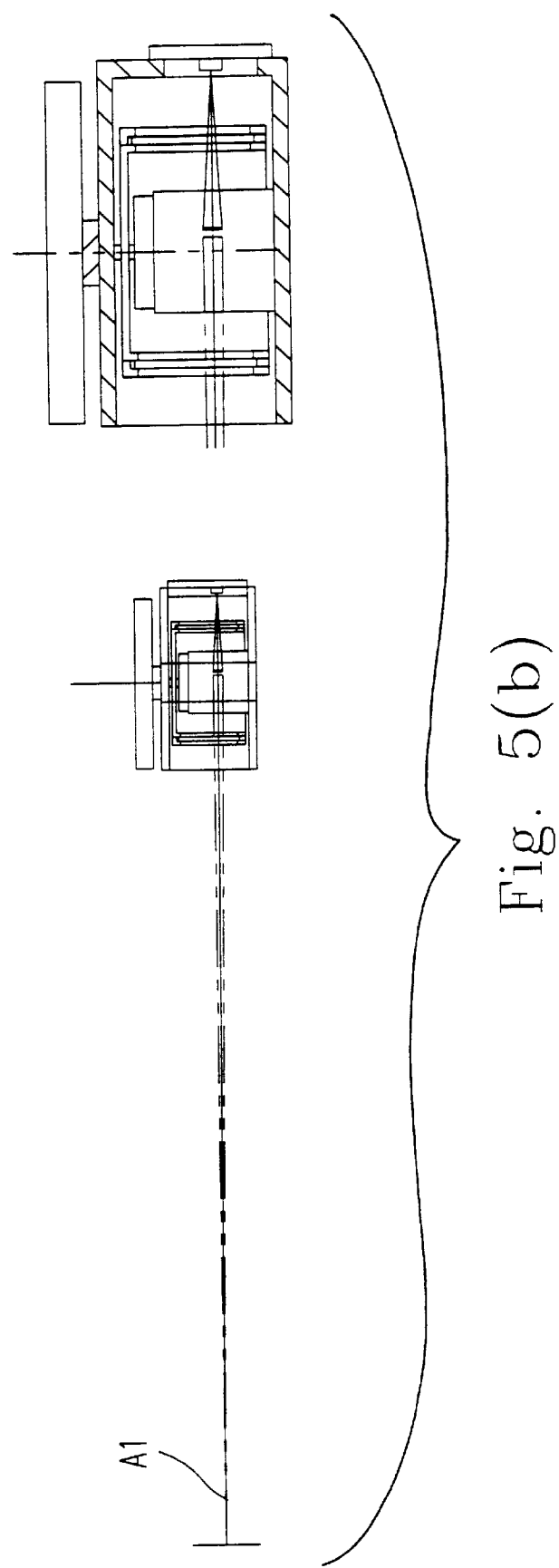

ROTARY DRUM TYPE OPTICAL FILTER APPARATUS

FIELD OF THE INVENTION

The present invention relates to an optical filter apparatus, and more particularly to a rotary drum type optical filter apparatus used in conjunction with a scanner.

BACKGROUND OF THE INVENTION

Generally an optical scanner heretofore employs a spectral apparatus to spectralize an optical signal by the principle of optical projection, however, the conventional spectral apparatus has some disadvantages as below:

1. Please refer to FIG. 1, which is a filter bracket 5 having red 1, green 2, blue 3, and transparent 4 filters to be attached on a plane thereof. Said filter bracket 5 is provided between an object to be scanned and a set of lens for moving reciprocally by means of a driving mechanism 6, such that a light signal can pass different filters to achieve a spectral effect of said light signal. The disadvantage is that there will exists an inertia when said filter bracket 5 is moving, so a vibration will be generated to influence the stability of the spectral apparatus. In addition, the lateral movement of the filter bracket 5 will occupy a larger space within the scanner and should be improved.

2. Please refer to FIG. 2, which is a rotary drum type spectral apparatus 1 provided between an object 2 and a set of lens 3 for rotating by means of a motor 4 to spectralize an optical signal by filters of different colors on said rotary drum type spectral apparatus, wherein FIG. 2(*a*) is a top view of said spectral apparatus 1, and FIG. 2(*b*) is a side view of said spectral apparatus 1. However, since said rotary drum type spectral apparatus 1 is positioned in an optical path formed by reflective mirrors M1, M2, M3 and lens 3, which results in a big volume and a higher cost, and causes vibration during rotating.

SUMMARY OF THE INVENTION

Therefore, the major object of the present invention is to provide a rotary drum type optical filter apparatus with a much reduced volume and to be assembled very easily.

Another object of the present invention is to provide a rotary drum type optical filter apparatus with low noise and vibration.

According to the above idea, the present invention relates to a rotary drum type type optical filter apparatus, which comprises a filter unit for receiving an optical signal to spectralize said optical signal; a lens unit provided at the center of said filter unit for varying an optical path of said optical signal; and a driving device engaged with said filter unit for providing a displacement of said filter unit relative to said lens unit to obtain different spectrum colors of said optical signal.

According to the above idea, wherein said filter unit comprises a filter bracket having a plurality of lattices, and a plurality of filters provided fixedly on said plurality of lattices for receiving said optical signal to spectralize said optical signal.

According to the above idea, wherein said filter bracket is prism-like.

According to the above idea, wherein said filter bracket can be hexagonal.

According to the above idea, wherein said plurality of lattices are attached alternately with red, green and blue filters.

According to the above idea, wherein said plurality of lattices are attached sequentially with red, green and blue filters.

According to the above idea, wherein said filter bracket can be octagonal.

According to the above idea, wherein said plurality of lattices are attached alternately with red, green, blue, and transparent filters.

According to the above idea, wherein said plurality of lattices are attached sequentially with red, green, blue, and transparent filters.

According to the above idea, wherein said filter unit further comprises a driven gear engaged with said filter unit.

According to the above idea, wherein said driving device comprises a driving gear engaged with said filter unit for driving said filter unit; and a motor engaged with said driving gear for driving said driving gear as well as said filter unit.

According to the above idea, wherein said motor is a stepping motor.

According to the above idea, wherein said displacement is an angular displacement.

According to the above idea, wherein said displacement can be a linear displacement.

According to the above idea, wherein said rotary drum type optical filter apparatus can be used in a scanner.

BRIEF DESCRIPTIONS OF THE DRAWINGS

The present invention can be better understood by the detailed descriptions of the following drawings, in which:

FIG. 1 is a front view of a conventional spectral apparatus in a canner.

FIGS. 2(*a*) and 2(*b*) are schematic structure views of another conventional spectral apparatus in a scanner.

FIGS. 3(*a*)~3(*f*) are schematic diagrams illustrating the operation principle of a preferred embodiment of the present invention.

FIG. 4 is an exploded perspective view of the preferred embodiment of the present invention.

FIGS. 5(*a*) and 5(*b*) are schematic structure views of the preferred embodiment of the present invention in conjunction with a scanner.

FIG. 6 is a schematic diagram illustrating the operation principle of the preferred embodiment of the present invention in conjunction with a scanner.

DETAILED DESCRIPTION OF THE PREFERRED EMBODIMENT

Please refer to FIGS. 3(*a*)~3(*f*), which are schematic diagrams illustrating the operation principle of a preferred embodiment of the present invention, where there comprises a lens unit 1, a CCD 2, and a filter unit, said filter unit includes a filter bracket 3 with red (R), green (G), blue (B) filters each attached on one lattice of said filter bracket respectively, while transparent (T) filters are attached on other lattices. In fact, only red (R), green (G), blue (B) filters are necessary to be attached on lattices of the filter bracket to achieve the effect of spectralizing the optical signal Al, the purpose of the transparent (T) filters is to balance the weight of the filter unit and to avoid disturbing the air flow during rotation of the filter bracket 3 so as to reduce any noise.

As shown in FIG. 3(*a*), because of the rotation of said filter bracket 3 by a driving device, an optical signal A1 projected on said filter unit is perpendicular to said red filter and passes through said lens unit 1 and said transparent (T) filter to be projected on said CCD 2, so said CCD 2 will sense the red component of said optical signal A1. Similarly, as the filter bracket 3 rotates to let the green (G) filter face the light as shown in FIG. 3(*b*), said CCD 2 will sense the green component of said optical signal A1. If the blue (B) filter is rotated to face the light as shown in FIG. 3(*c*), then said CCD 2 will sense the blue component of said optical signal A1.

The filters can be arranged as shown in FIGS. 3(*d*), 3(*e*), and 3(*f*), where red (R), green (G), and blue(B) filters are attached on said filter bracket 3 sequentially, while transparent (T) filters are attached on rest lattices of the filter bracket. Therefore, when the filter bracket 3 is rotated to be as shown in FIG. 3(*d*), the red component of the optical signal A1 is obtained. Similarly, the green (G) and blue (B) components of the optical signal A1 can be obtained when the filter bracket 3 is rotated as shown in FIGS. 3(*e*) and 3(*f*) respectively. As the filter bracket 3 rotates a circle, the optical signal will be spectralized twice for each optical component.

Figure 1:
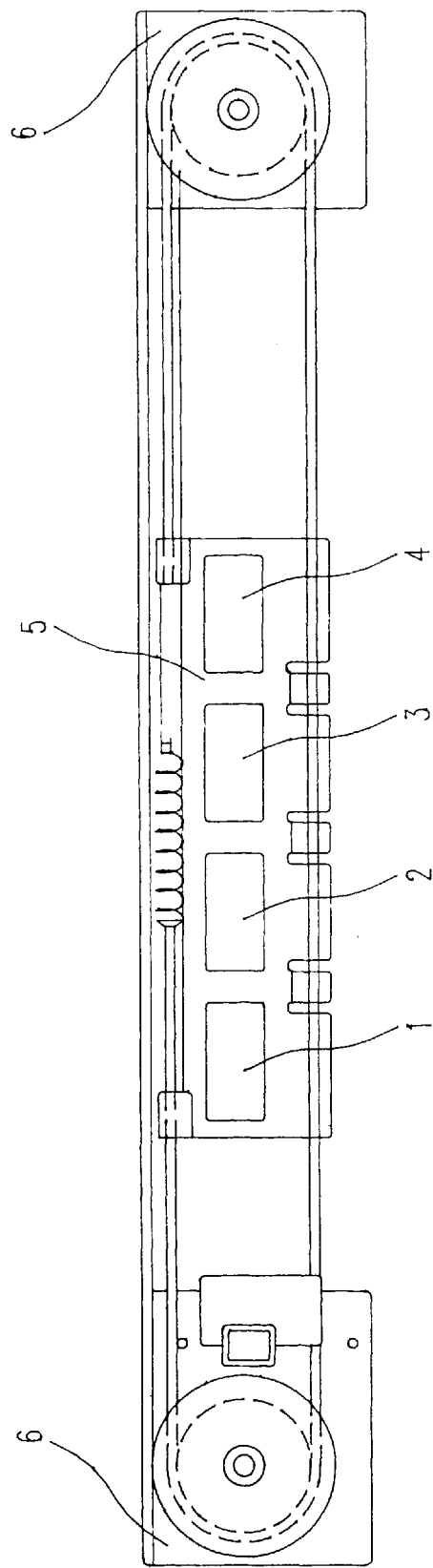
Figure 3A:
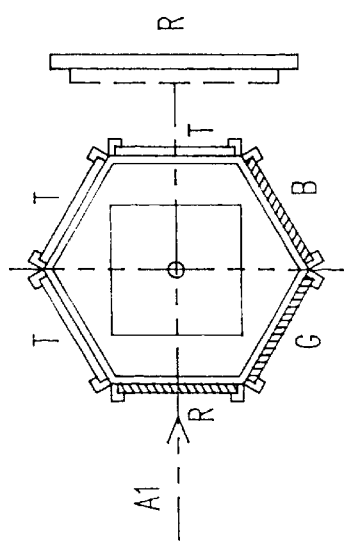
Figure 3B:
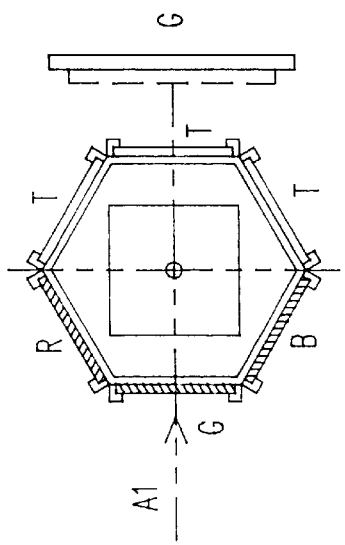
Figure 3C:
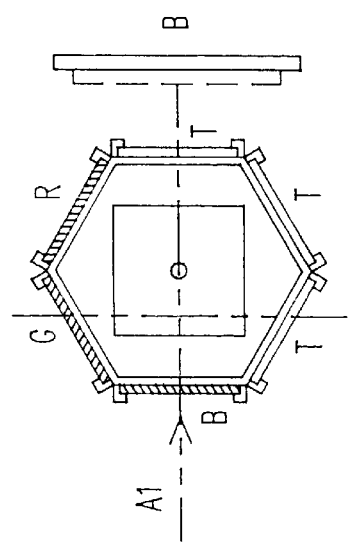
Figure 3D:
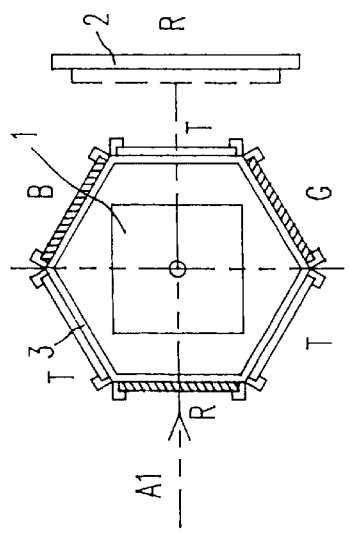
Figure 3E:
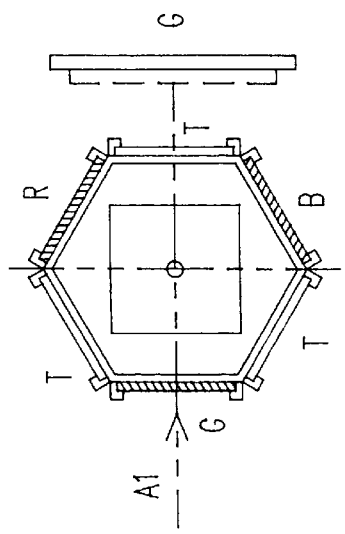
Figure 3F:
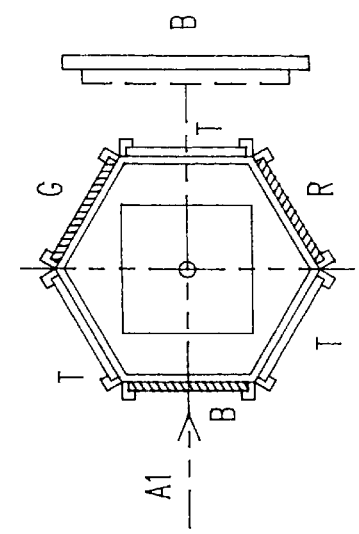
Figure 4:
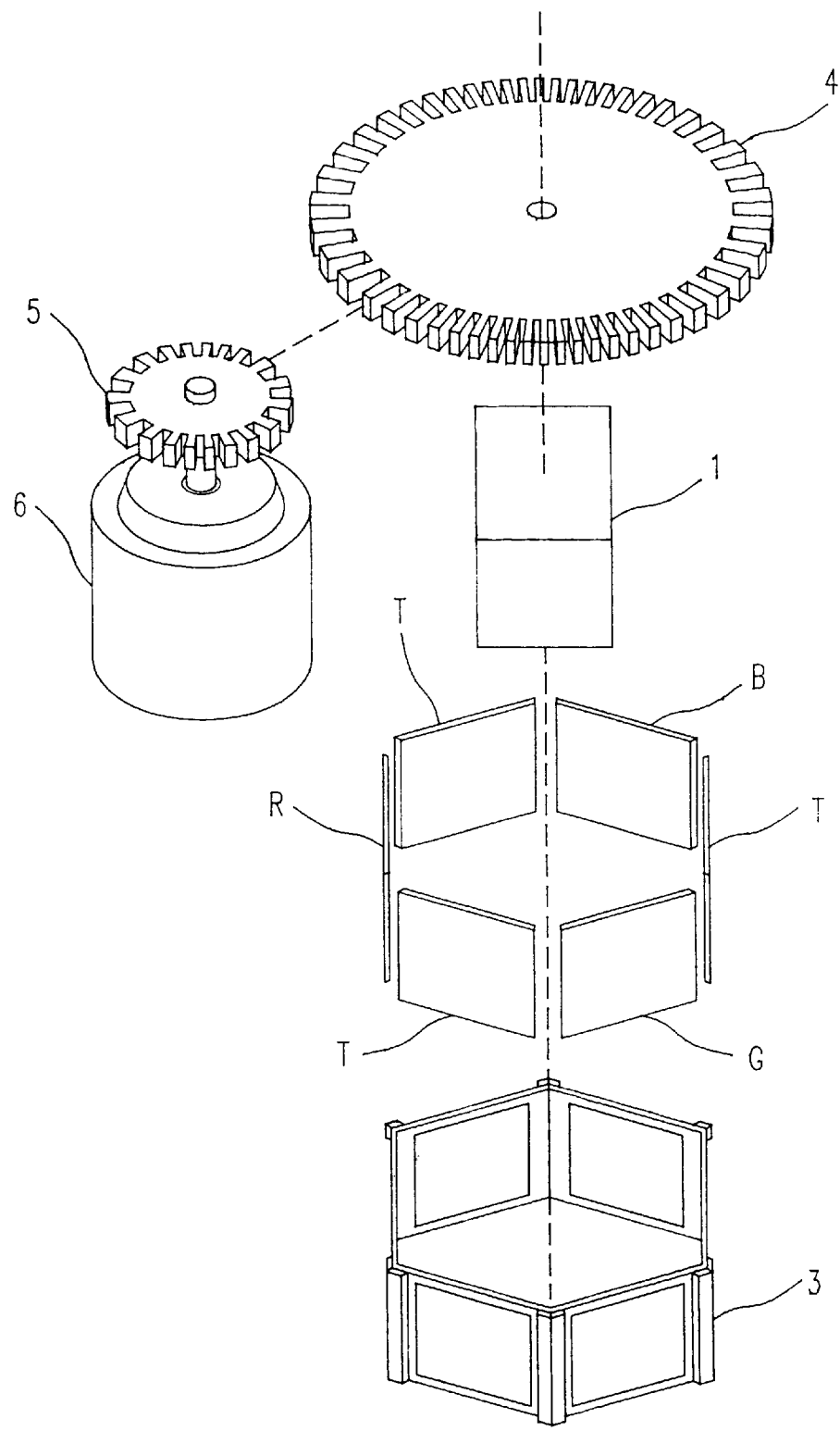

Please refer to FIG. 4, which is an exploded perspective view of the preferred embodiment of the present invention, where there comprises a lens unit 1, a filter bracket 3, a driven gear 4, a driving gear 5, a stepping motor 6. The lattices of said filter bracket 3 are attached with red (R), green (G), blue (B), and transparent (T) filters. Said filter bracket 3 is a hexagonal type with a lens unit 1 being provided at the center.

The driven gear 4 is engaged with the filter bracket 3, while the driving gear 5 is engaged with said driven gear 4. A stepping motor 6 is used to drive said driving gear 5 as well as said driven gear 4 so that said filter bracket 3 is rotated with said lens unit 1 as a rotating center. By controlling said stepping motor 6, two opposite filters will be parallel to the mirror plane of the lens unit 1 for each step, so that said optical signal A1 will pass through the filter unit and the lens unit 1 to obtain the red, green, blue components of the optical signal respectively.

Figure 5A:
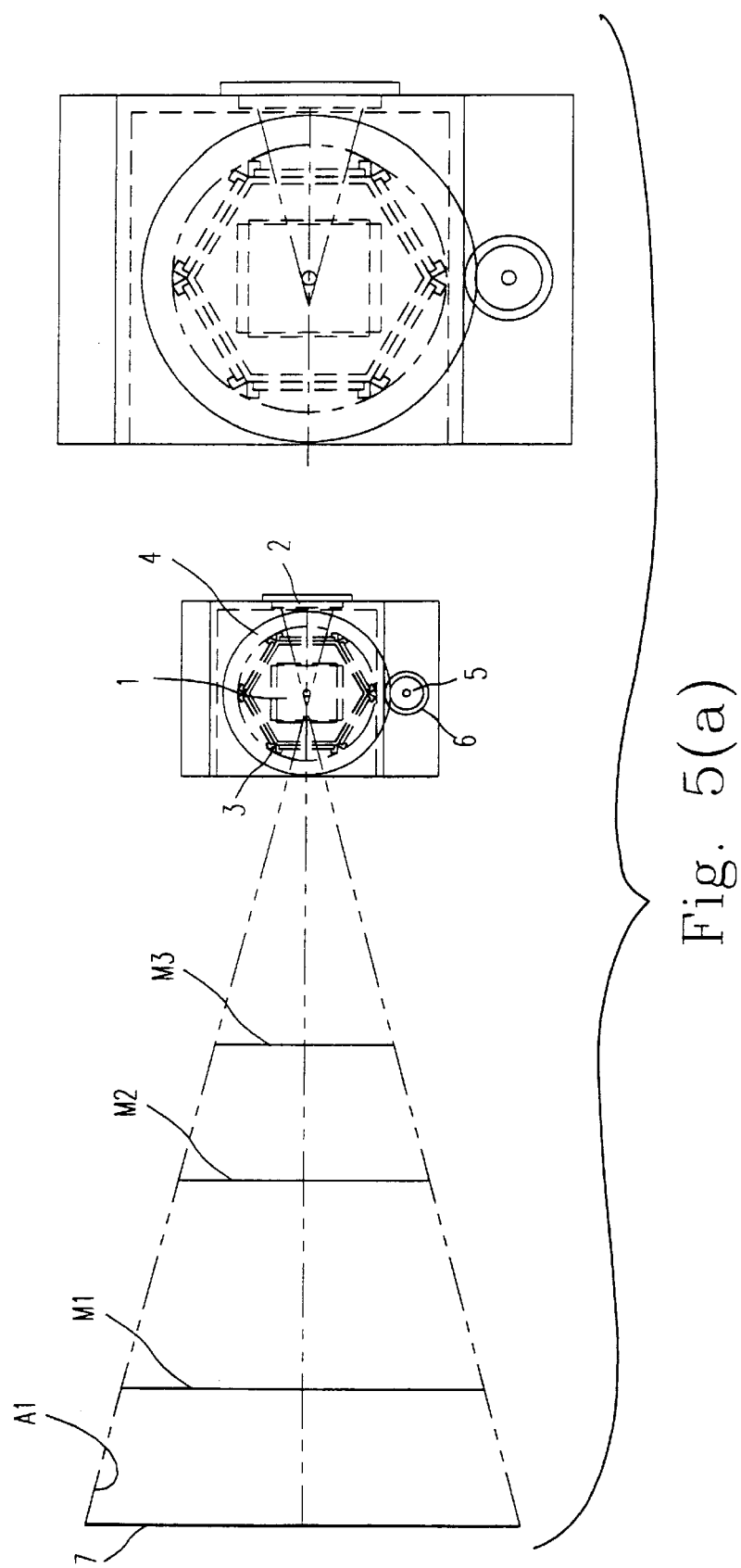
Figure 6:
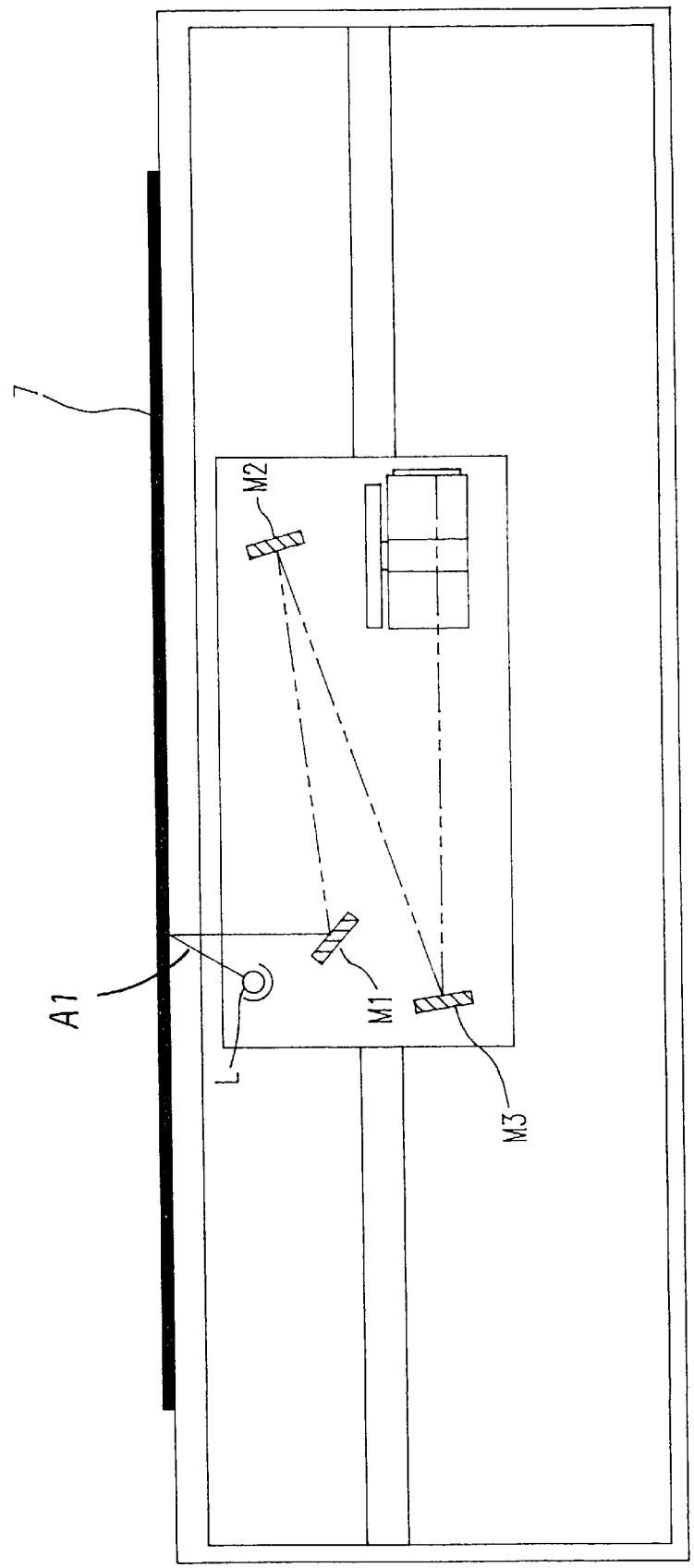

Please refer to FIGS. 5(*a*) and 5(*b*), which are schematic structure views of the preferred embodiment of the present invention in conjunction with a scanner. FIG. 5(*a*) is a top view, while FIG. 5(*b*) is a side view. The operation principle of the present invention is shown in FIG. 6. During optical reading of the present embodiment, the mirror plane of the lens unit 1 for optical reading is parallel to two filters of the filter bracket 3. A light source L transmits an optical signal A1 onto an object 7 (see FIG. 6), and is reflected by said object, reflectors M1, M2, and M3, then enters said filter unit. The red (R), green (G), and blue (B) filters will be drived by the stepping motor of the present invention to face the optical signal so as to read the red, green, and blue components by said CCD 2 respectively.

The operation principle of the above lens unit 1 and CCD 2 is well know in the art, so any detail description is not necessary. The present invention is characterised in that said lens unit 1 is provided at the center of said filter unit, so that the lens unit is most close to the filter unit 1, that is to say a filter unit with much reduced volume can be provided in the optical path of the optical signal A1. Furthermore, as the filter bracket 3 rotates a circle, the optical signal will be spectralized twice for each optical component, thereby the optical reading time is reduced. A stepping motor is also provided to control accurately the rotation of the filter unit.

The above embodiments can be modified by any skillful person in the art without departing the spirit and scope of the accompanying claims.

What is claimed is:

1. A rotary drum type optical filter apparatus, comprising:

a filter unit for receiving an optical signal to spectralize said optical signal;

a lens unit provided completely inside said filter unit for varying an optical path of said optical signal wherein said lens unit has a smaller dimension than that of said filter in the same direction; and a driving device engaged with said filter unit for providing a displacement of said filter unit relative to said lens unit to obtain different spectral components of said optical signal.

2. The apparatus according to claim 1, wherein said filter unit comprises:

a filter bracket having a plurality of lattices, and a plurality of filters provided fixedly on said plurality of lattices for receiving said optical signal to spectralize said optical signal.

3. The apparatus according to claim 2, wherein said filter bracket has a shape of a prism.

4. The apparatus according to claim 3, wherein said prism is hexagonal.

5. The apparatus according to claim 4, wherein said plurality of lattices are attached alternately with a red, a green and a blue filters.

6. The apparatus according to claim 5, wherein three transparent filters are each attached on other lattices between said red, green and blue filters.

7. The apparatus according to claim 4, wherein said plurality of lattices are attached sequentially with a red, a green and a blue filters.

8. The apparatus according to claim 4, wherein said plurality of lattices are attached sequentially with a red, a green, a blue and three transparent filters.

9. The apparatus according to claim 3, wherein said prism is octagonal.

10. The apparatus according to claim 9, wherein said plurality of lattices are attached alternately with a red, a green, a blue, and a transparent filters.

11. The apparatus according to claim 10, wherein four additional transparent filters are each attached on other lattices between said red, green, blue and transparent filters.

12. The apparatus according to claim 9, wherein said plurality of lattices are attached sequentially with a red, a green, a blue and a transparent filters.

13. The apparatus according to claim 9, wherein said plurality of lattices are attached sequentially with a red, a green, a blue and five transparent filters.

14. The apparatus according to claim 2, wherein said filter unit further comprises a driven gear engaged with said filter unit.

15. The apparatus according to claim 1, wherein said driving device comprises:

a driving gear engaged with said filter unit for driving said filter unit; and a motor engaged with said driving gear for driving said driving gear as well as said filter unit.

16. The apparatus according to claim 15, wherein said motor is a stepping motor.

17. The apparatus according to claim 1, wherein said displacement is an angular displacement.

18. The apparatus according to claim 1, wherein said apparatus can be used in a scanner.

\* \* \* \* \*